(12) United States Patent
Zhou et al.

(10) Patent No.: US 12,538,378 B2
(45) Date of Patent: Jan. 27, 2026

(54) ENERGY SAVING METHOD AND DEVICE IN SIDELINK SYSTEM

(71) Applicant: Samsung Electronics Co., Ltd., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/030,893

(22) PCT Filed: Oct. 14, 2021

(86) PCT No.: PCT/KR2021/014226
§ 371 (c)(1),
(2) Date: Apr. 7, 2023

(87) PCT Pub. No.: WO2022/080888
PCT Pub. Date: Apr. 21, 2022

(65) Prior Publication Data
US 2023/0371113 A1 Nov. 16, 2023

(30) Foreign Application Priority Data
Oct. 14, 2020 (CN) .......................... 202011099124.1

(51) Int. Cl.
*H04W 76/28* (2018.01)
*H04W 52/02* (2009.01)
*H04W 92/18* (2009.01)

(52) U.S. Cl.
CPC ....... *H04W 76/28* (2018.02); *H04W 52/0216* (2013.01); *H04W 92/18* (2013.01)

(58) Field of Classification Search
CPC . H04W 76/28; H04W 52/0216; H04W 92/18; H04W 76/14; H04W 52/0235; H04W 72/0446; H04W 72/25; Y02D 30/70; H04L 1/1812
See application file for complete search history.

(56) References Cited

U.S. PATENT DOCUMENTS

| 11,252,753 | B2* | 2/2022 | Chen | H04W 72/23 |
| 12,058,538 | B2* | 8/2024 | Tenny | H04W 24/04 |
| 2016/0088681 | A1 | 3/2016 | Chang et al. | |
| 2018/0227973 | A1 | 8/2018 | Tsuboi et al. | |
| 2020/0112982 | A1 | 4/2020 | Li et al. | |
| 2021/0068189 | A1* | 3/2021 | Hahn | H04W 76/36 |

(Continued)

FOREIGN PATENT DOCUMENTS

| EP | 3499975 A1 | 6/2019 |
| WO | 2017/136627 A1 | 8/2017 |

*Primary Examiner* — Kibrom T Hailu
(74) *Attorney, Agent, or Firm* — Jefferson IP Law, LLP

(57) ABSTRACT

The present disclosure relates to a pre-5th generation (5G) or 5G communication system to be provided for supporting higher data rates beyond 4th generation (4G) communication system such as long term evolution (LTE). The application provides an energy-saving method and a device in a Sidelink system, the method includes: acquiring discontinuous transmission DTX configuration from a network node; determining a first time range and/or a second time range according to the acquired DTX configuration; staying awake in the first time range, or entering into a sleep state in the second time range.

18 Claims, 11 Drawing Sheets

(56) References Cited

U.S. PATENT DOCUMENTS

| | | | | |
|---|---|---|---|---|
| 2021/0344454 | A1* | 11/2021 | Lee | H04L 5/0064 |
| 2022/0104035 | A1* | 3/2022 | Tenny | H04W 4/50 |
| 2022/0385409 | A1* | 12/2022 | Park | H04W 4/40 |
| 2023/0156792 | A1* | 5/2023 | Yao | H04W 72/02 |
| | | | | 370/329 |
| 2023/0337140 | A1* | 10/2023 | Miao | H04L 5/0053 |

* cited by examiner

ENERGY SAVING METHOD AND DEVICE IN SIDELINK SYSTEM

TECHNICAL FIELD

The present invention relates to the technical field of wireless communication, and more particularly, to a method and device for saving energy in Sidelink (SL) communication in a fifth generation new radio (5G NR) technical system.

BACKGROUND ART

In order to meet the increasing demand for wireless data communication services since the deployment of 4G communication systems, efforts have been made to develop improved 5G or quasi-5G communication systems. Therefore, 5G or quasi-5G communication system is also called "super 4G network" or "post-LTE system".

The 5G communication system is implemented in a higher frequency (millimeter, mmWave) band, for example, a 60 GHz band, to achieve a higher data rate. In order to reduce the propagation loss of radio waves and increase the transmission distance, beamforming, large-scale multiple-input multiple-output (MIMO), full-dimensional MIMO (FD-MIMO), array antenna, analog beamforming and large-scale antenna technologies are discussed in 5G communication system.

In addition, in 5G communication system, based on advanced small cell, cloud radio access network (RAN), ultra dense network, device-to-device (D2D) communication, wireless backhaul, mobile network, cooperative communication, cooperative multipoint (CoMP), receiver interference cancellation, etc., the development of system network improvement is underway.

In 5G systems, advanced coding modulation (ACM), such as hybrid FSK and QAM modulation (FQAM) and sliding window superposition coding (SWSC), and advanced access technologies, such as filter bank multicarrier (FBMC), non-orthogonal multiple access (NOMA) and sparse code multiple access (SCMA) have been developed.

DISCLOSURE OF INVENTION

Technical Problem

Embodiments of the present disclosure provide methods and apparatuses for saving energy in sidelink (SL) communication.

Solution to Problem

According to one aspect of the present invention, there is provided a method executed by a first terminal supporting Sidelink in a Sidelink system, which includes: acquiring discontinuous transmission DTX configuration from a network node; determining a first time range and/or a second time range according to the acquired DTX configuration; staying awake in the first time range, or entering into a sleep state in the second time range.

According to an aspect of the present invention, there is provided a method executed by a first terminal supporting Sidelink in a Sidelink system, wherein the DTX configuration includes periodic and/or aperiodic DTX configuration.

According to one aspect of the present invention, there is provided a method executed by a first terminal supporting Sidelink in a Sidelink system, wherein the DTX configuration includes at least one of the following items: a first time range corresponding to all Sidelink transmissions and/or uplink and/or downlink transmissions in one cycle; a first time range corresponding to the Sidelink transmission scheduled by a configured grant in one cycle, wherein the configured grant includes the type 1 configured grant and/or type 2 configured grant indicated by RRC and/or RRC and DCI; a first time range corresponding to the Sidelink transmission scheduled by a dynamic grant in one cycle, wherein the dynamic grant includes the dynamic grant indicated by DCI; a first time range corresponding to channel perception; a first time range corresponding to a resource for transmitting PSSCH within one cycle, wherein the resource is determined by the first terminal based on channel perception; a first time range corresponding to the Sidelink transmission of a specific priority or priorities in one cycle; a first time range corresponding to the Sidelink transmission of a specific transmission type in one cycle; a first time range corresponding to the Sidelink transmission of a specific one or more destination IDs in one cycle; a first time range corresponding to the Sidelink transmission of a specific one or more source IDs in one cycle; a first time range corresponding to the Sidelink transmission of one or more specific HARQ feedback options and/or of HARQ process IDs in one cycle; a first time range corresponding to one or N specific Sidelink transmissions in one cycle, where N is a positive integer; a first time range corresponding to the initial transmission of one TB in one cycle; a first time range corresponding to N HARQ retransmissions of one TB in one cycle, where n is a non-negative integer; a first time range corresponding to the transmission of PSSCH and/or associated PSCCH; a first time range corresponding to the transmission of PSFCH of PSSCH; a first time range corresponding to resource reselection, wherein the resource reselection includes resource reselection triggered by other terminals occupying their own selected resources; a first time range corresponding to NR Sidelink communication; a first time range corresponding to LTE Sidelink communication; a first time range corresponding to UE with specific UE capability; a first time range corresponding to an uplink and/or downlink transmission corresponding to the one or more Sidelink transmissions; and a second time range, wherein the second time range includes an explicitly configured second time range indicated in the same manner as the first time range, or wherein the second time range is set such that all time domain resources that do not belong to the first time range within one cycle belong to the second time range.

According to an aspect of the present invention, there is provided a method executed by a first terminal supporting Sidelink in a Sidelink system, wherein determining the first time range and/or the second time range according to the DTX configuration includes at least one of the following: determining a first time range −1 according to an indication in the DTX configuration; determining a first time range −2 according to the first time range −1 and the offset between the first time range −1 and the first time range −2 indicated in the DTX configuration; or determining the first time range and/or the second time range according to whether the first terminal needs retransmission, and/or whether the first terminal needs to transmit new data, and/or resources reserved by the first terminal in SCI.

According to an aspect of the present invention, there is provided a method executed by a first terminal supporting Sidelink in a Sidelink system, wherein it is dynamically determined whether any one of the first time ranges exists and/or whether any one of the second time ranges exists according to the DTX configuration.

According to one aspect of the present invention, there is provided a method executed by a first terminal supporting Sidelink in a Sidelink system, further comprising: after determining the first time range and/or the second time range, the first terminal executes at least one of the following when a predetermined condition is met: entering a sleep state in the first time range or a subset thereof; staying awake for the second time range or a subset thereof.

According to an aspect of the present invention, there is provided a method executed by a first terminal supporting Sidelink in a Sidelink system, further comprising: if the first time range corresponds to the transmission of PSSCH and/or PSFCH, and the data corresponding to PSSCH and/or PSFCH is not successfully transmitted, staying awake in the second time range and trying to retransmit the data corresponding to PSSCH and/or PSFCH until a condition of entering the sleep state is met.

According to an aspect of the present invention, there is provided a method executed by a first terminal supporting Sidelink in a Sidelink system, wherein the conditions for entering the sleep state include at least one of the following: the data is successfully transmitted, the transmission on the resources reserved in the SCI associated with the PSSCH has been completed, the number of retransmissions of the data does not meet a specific threshold range, the retransmission of the data is dropped, or the time for staying awake in the second time range does not meet a specific threshold range.

According to an aspect of the present invention, there is provided a method executed by a first terminal supporting Sidelink in a Sidelink system, further comprising: if the first time range corresponds to the transmission of PSSCH and/or PSFCH, and there are other data to be transmitted, staying awake in the second time range and trying the retransmission of the data corresponding to the PSSCH and/or PSFCH until a condition for entering the sleep state is met.

According to an aspect of the present invention, there is provided a method executed by a first terminal supporting Sidelink in a Sidelink system, wherein the conditions for entering the sleep state include at least one of the following: the other data is successfully transmitted, the transmission on the resources reserved in the SCI associated with the PSSCH has been completed, the transmission of the other data is dropped, or the time for staying awake in the second time range does not meet a specific threshold range.

According to an aspect of the present invention, there is provided a method executed by a first terminal supporting Sidelink in a Sidelink system, further comprising: if the first time range corresponds to transmission of PSSCH and/or PSFCH, and the transmission corresponding to PSSCH and/or PSFCH includes initial transmission and retransmission, entering the sleep state after data transmission is completed within the first time range.

According to an aspect of the present invention, there is provided a method executed by a first terminal supporting Sidelink in a Sidelink system, wherein the completing of the data transmission includes: one TB is successfully transmitted and/or no new TB needs to be transmitted.

According to an aspect of the present invention, there is provided a method executed by a first terminal supporting Sidelink in a Sidelink system, further comprising: if the first time range corresponds to the transmission of PSSCH and/or PSFCH, staying awake only on time domain resources that need to transmit PSSCH and/or receive the transmission of PSFCH within the first time range.

According to an aspect of the present invention, there is provided a method executed by a first terminal supporting Sidelink in a Sidelink system, further comprising: if the first time range corresponds to the transmission of PSSCH and/or PSFCH, staying awake at the following time within the first time range: before receiving the first specific PSSCH; and time domain resources for receiving the data carried in the first specific PSSCH, including receiving the initial transmission and/or retransmission of the data carried in the PSSCH until the reception is successful.

According to an aspect of the present invention, there is provided a device for executing a method in a Sidelink system, including a transceiver and a controller configured to acquire a DTX configuration of discontinuous transmission from a network node; determine a first time range and/or a second time range according to the acquired DTX configuration; stay awake in the first time range, or enter into a sleep state in the second time range.

According to one aspect of the present invention, there is provided a method for a first terminal to acquire a DTX configuration among different Sidelink terminals, including: acquiring a DTX configuration of a second terminal by the first terminal; executing the Sidelink transmission according to the DTX configuration of the second terminal.

According to one aspect of the present invention, there is provided a method for a first terminal to acquire a DTX configuration among different Sidelink terminals, wherein acquiring a DTX configuration of a second terminal by the first terminal includes: when a predetermined condition is met, the first terminal acquires a DTX configuration of the second terminal, wherein the predetermined condition includes at least one of the following: the first terminal is configured with DTX feature, the first terminal obtains the common DTX configuration or the DTX configuration of resource pool; the first terminal determines that DTX feature is enabled in the Sidelink system; according to the information broadcasted or sent by the second terminal to the first terminal, the first terminal decides that the second terminal enables or is configured with DTX feature; a first terminal receives trigger signaling from the second terminal or other devices, wherein the signaling is used to trigger the first terminal to acquire the DTX configuration of the second terminal; the first terminal transmits trigger signaling to the second terminal, wherein the trigger signaling is used to trigger the second terminal to transmit its DTX configuration to the first terminal; the identities of the first terminal and/or the second terminal belong to a predefined set; or the link quality between the first terminal and the second terminal does not meet a specific threshold range.

According to an aspect of the present invention, there is provided a method for a first terminal to acquire a DTX configuration between different Sidelink terminals, wherein the link quality includes link strength and/or transmission state between the first terminal and the second terminal, wherein the link strength includes measurement results of reference signals from the second terminal by the first terminal, and wherein the transmission state includes transmission failure times between the first terminal and the second terminal.

According to one aspect of the present invention, there is provided a method for a first terminal to acquire a DTX configuration among different Sidelink terminals, wherein acquiring the DTX configuration of the second terminal by the first terminal includes: receiving the DTX configuration of the second terminal indicated by the second terminal in the Sidelink signaling, and/or receiving the DTX configuration of the second terminal indicated by a third terminal in the Sidelink signaling, and/or receiving the DTX configuration of the second terminal indicated by a base station.

According to one aspect of the present invention, there is provided a method for a first terminal to acquire a DTX configuration among different Sidelink terminals, wherein acquiring the DTX configuration of the second terminal by the first terminal comprises: transmitting a trigger signaling to a network node, wherein the trigger signaling is used to trigger the second terminal to transmit the DTX configuration of the second terminal to the first terminal, and/or trigger the network node to transmit the DTX configuration of the second terminal to the first terminal, and wherein the network node includes the following: the second terminal, Sidelink terminals other than the first terminal and the second terminal, and a base station.

According to one aspect of the present invention, there is provided a method for a first terminal to acquire a DTX configuration between different Sidelink terminals, wherein the trigger signaling includes an identity of the second terminal.

According to an aspect of the present invention, there is provided a first device for performing a method of acquiring a DTX configuration between different Sidelink terminals, including: a transceiver configured to acquire the DTX configuration of a second device, and a controller configured to perform Sidelink transmission according to the DTX configuration of the second terminal.

Advantageous Effects of Invention

According to the disclosure, there is improvements in and relating to saving energy in sidelink (SL) communication.

MODE FOR THE INVENTION

Figure 1:
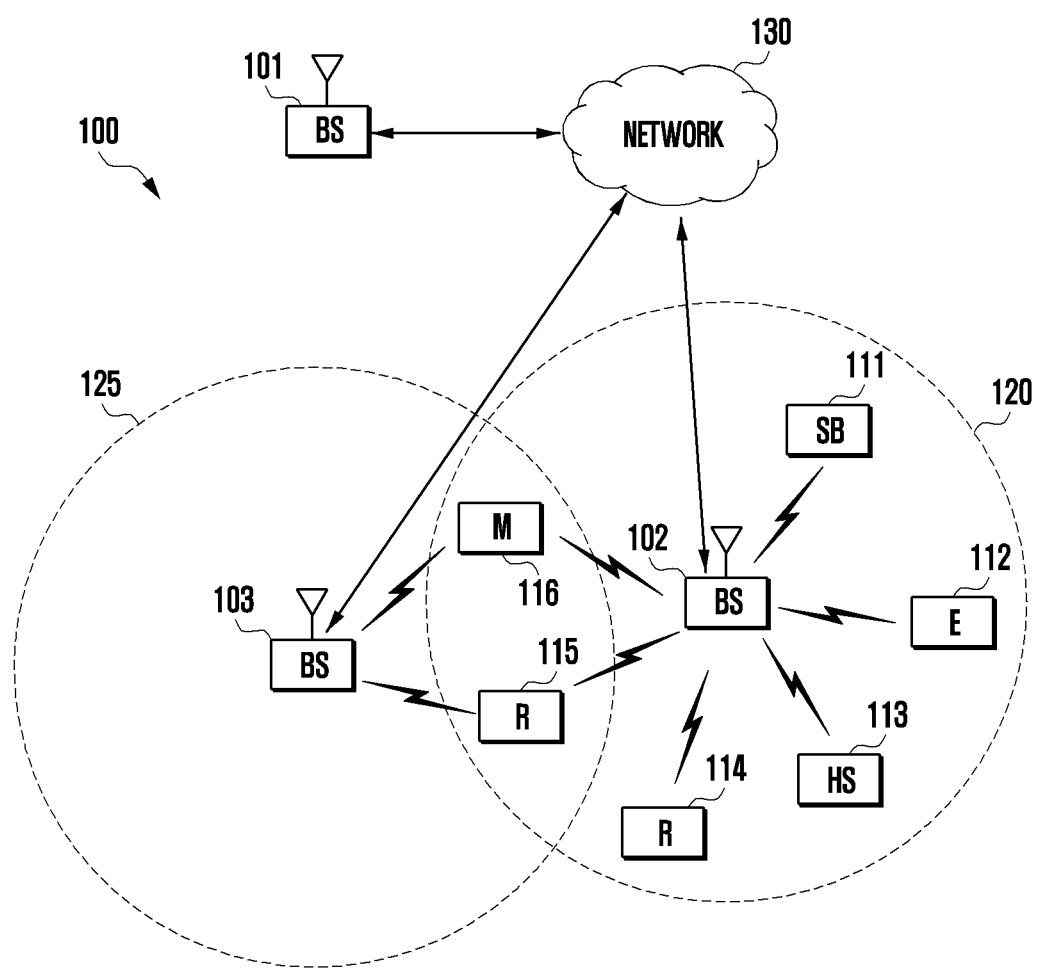
FIG. 1 shows a schematic diagram of an example wireless network 100 according to various embodiments of the present disclosure.

In the Long Term Evolution, LTE) technology, Sidelink communication includes direct communication from Device to Device (D2D) and vehicle to vehicle/infrastructure/pedestrian/network, V2X, which is designed based on D2D technology, V2X communication is superior to D2D in data rate, delay, reliability and link capacity, and is the most representative Sidelink communication technology in LTE technology. In 5G system, Sidelink communication mainly includes V2X communication at present.

There are several Sidelink physical channels defined in NR V2X system, including Physical Sidelink Control Channel (PSCCH), Physical Sidelink Shared Channel (PSSCH) and physical Sidelink feedback channel (PSFCH). The PSSCH is used to carry data, the PSCCH is used to carry Sidelink Control Information (SCI), and the SCI indicates information such as time-frequency domain resource location of the associated PSSCH transmission, modulation and coding mode, identifier ID of receiving destination targeted by the associated PSSCH, and the PSFCH is used to carry HARQ-ACK information corresponding to the data.

The current NR V2X system takes time slot in 5G system as the minimum unit of resource allocation in time domain, and defines Sub-Channel as the minimum unit of resource allocation in frequency domain, wherein one sub-channel is configured as several Resource Block (RB) in frequency domain, and one sub-channel can include resources corresponding to at least one of PSCCH, PSSCH and PSFCH.

From the perspective of resource allocation, the 5G Sidelink communication system includes two options: one is the resource allocation mode based on base station scheduling; the other is a resource allocation mode independently selected by User Equipment, UE. In 5G V2X system, the resource allocation mode based on base station scheduling is called Mode 1, the resource allocation mode autonomously selected by UE is called mode 2.

In mode 1, the resource allocation mode based on base station scheduling means that the base station transmits a Sidelink grant to the UE (hereinafter referred to as "Sidelink UE") for Sidelink transmission, and indicates several Sidelink resources for the Sidelink UE in the Sidelink grant, and/or indicates periodic Sidelink resources for the Sidelink UE in the Sidelink grant. Sidelink grant includes dynamic grant and configured grant, wherein the dynamic grant is indicated by Downlink Control Information, DCI; the configured grant further includes type 1 configured grant indicated by Radio Resource Control (RRC) signaling and type 2 configured grant indicated by RRC signaling and activated/deactivated by DCI.

In mode 2, the method for the Sidelink UE to select resources autonomously means that the UE determines a specific time window before the Sidelink transmission according to the expected time range for transmitting the Sidelink transmission, and the UE perceives the channel within the specific time window, then excludes the Sidelink resources that have been reserved by other Sidelink UEs according to the channel sensing result, and randomly selects the Sidelink resources that have not been excluded.

In the Sidelink system of 5G NR version 16, when the Sidelink UE is the communication receiver, it is impossible to predict when the communication from other potential Sidelink UE will be received, so it is necessary to keep monitoring on the configured resource pool all the time. In addition, even if the receiving function of the Sidelink UE is allowed to be disabled in the subsequent version, as the transmitter of the Sidelink communication, the Sidelink UE needs to execute channel sensing based on monitoring on the resource pool when using mode 2, therefore the Sidelink reception related to channel sensing is inevitable. Accordingly, the power consumption caused by the Sidelink receiving behavior is a serious burden for some Sidelink terminals, especially the pedestrian handheld terminals.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
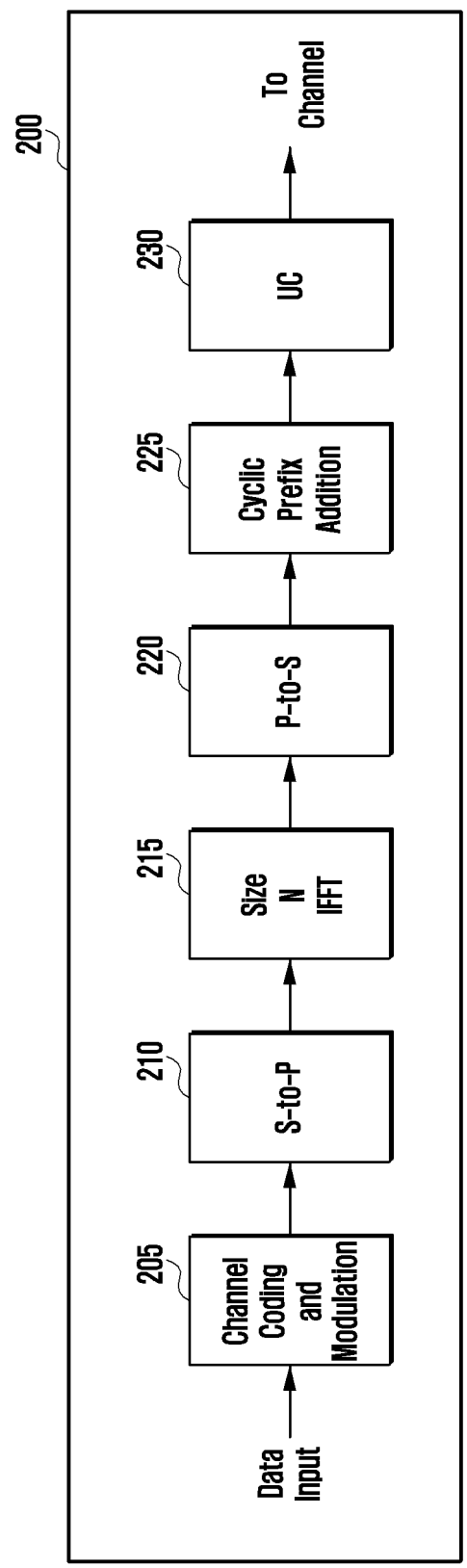
FIG. 2a shows schematic diagrams of example wireless transmission and reception paths according to the present disclosure.
Figure 2B:
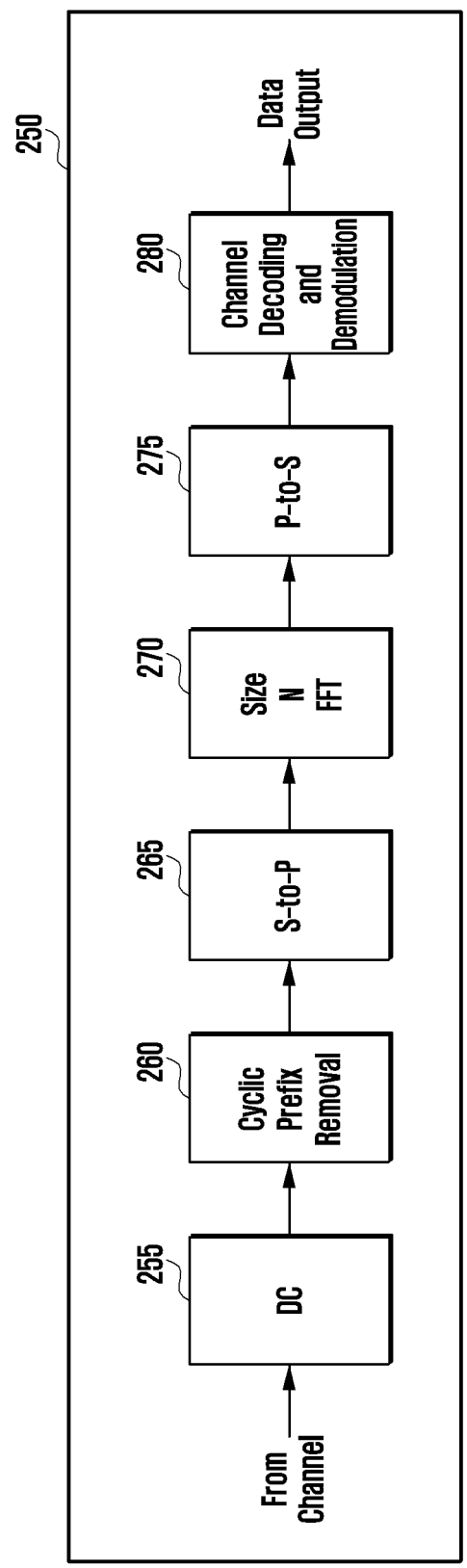
FIG. 2b shows schematic diagrams of example wireless transmission and reception paths according to the present disclosure.

FIGS. 2a and 2b illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
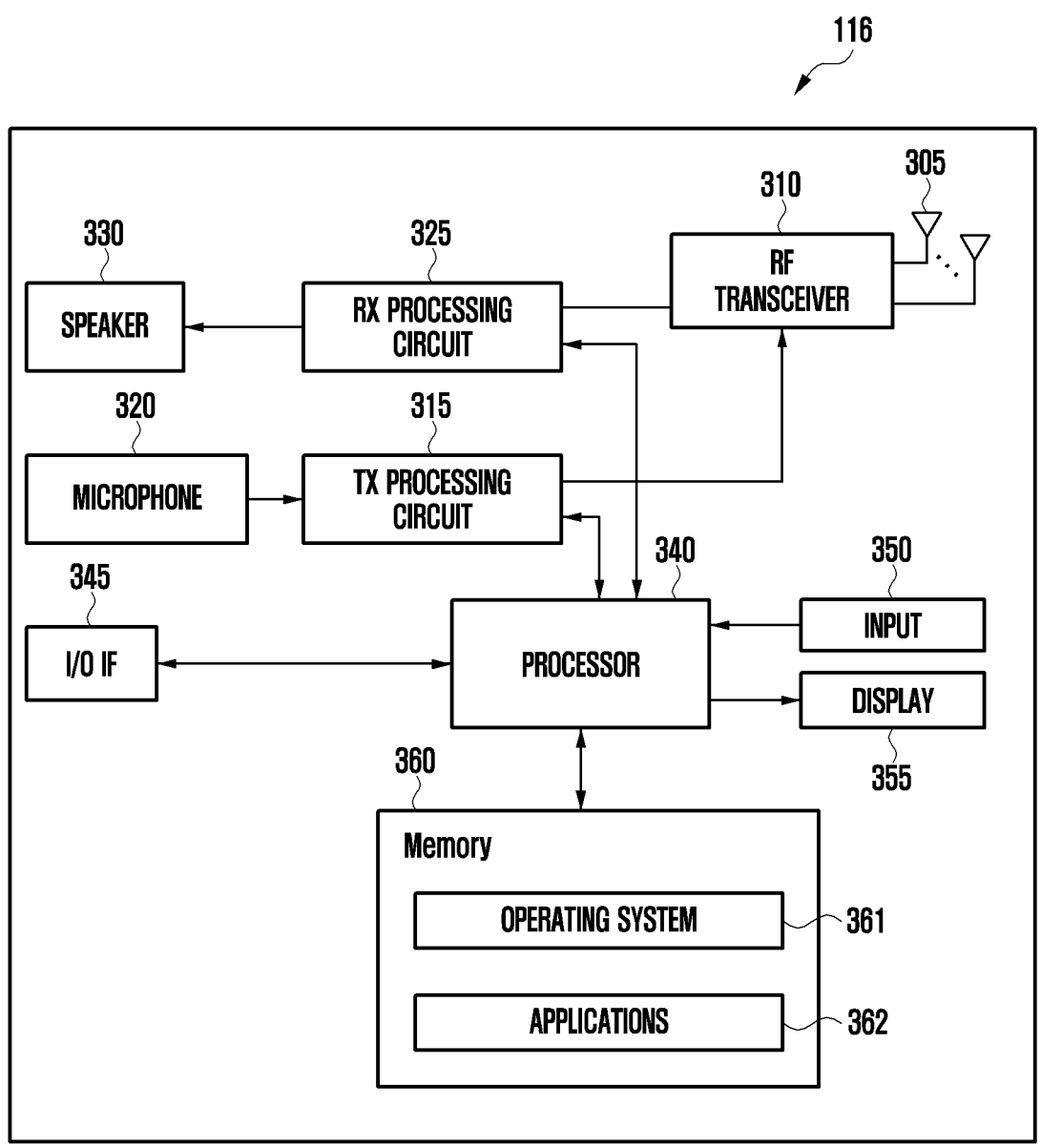
FIG. 3a shows a schematic diagram of an example UE 116 according to the present disclosure.

FIG. 3a illustrates an example UE 116 according to the present disclosure. The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
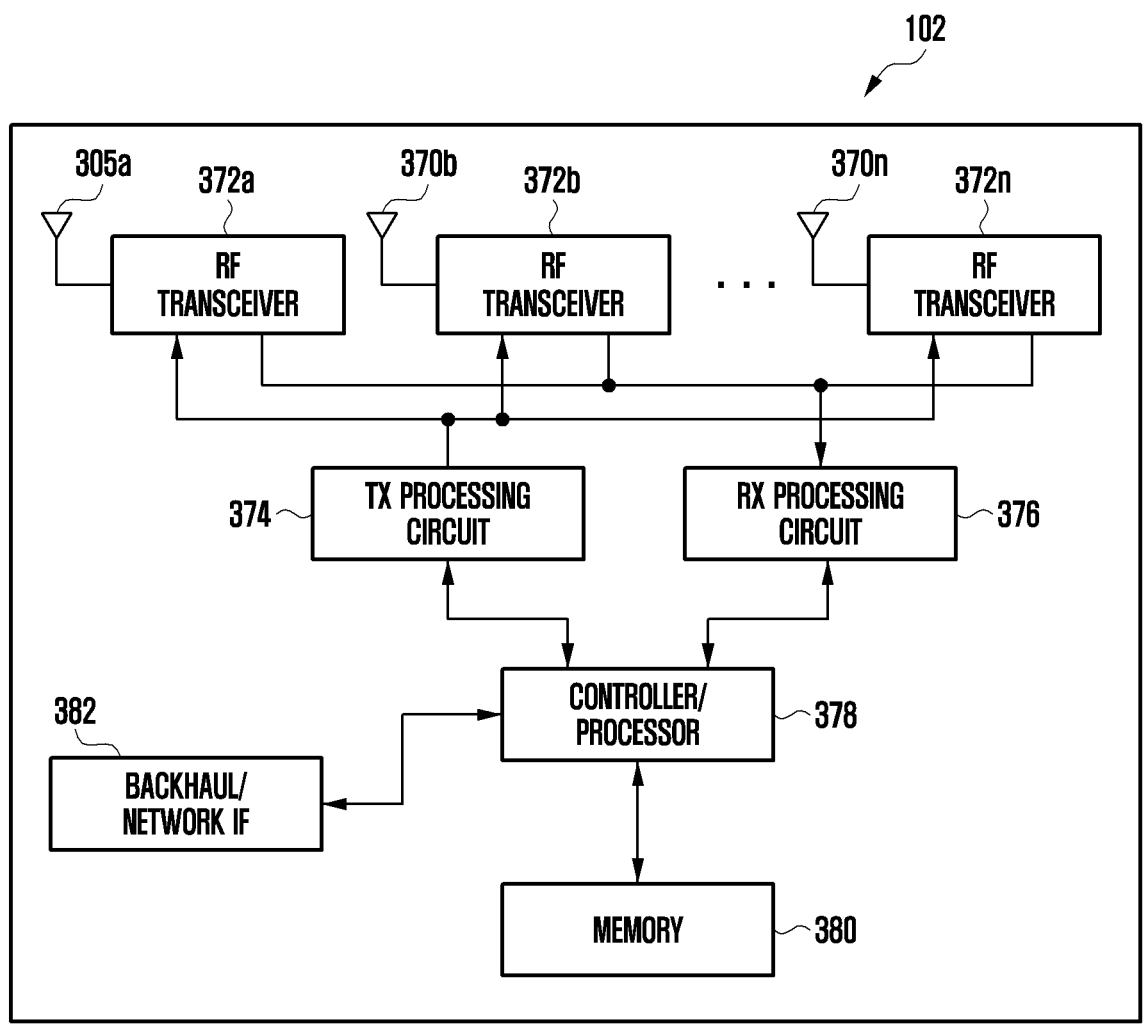
FIG. 3b shows a schematic diagram of an example gNB 102 according to the present disclosure.

FIG. 3b illustrates an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and upconvert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

It should be understood that the text and drawings are provided as examples only to help the reader understand the present disclosure. They are not intended and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

A time slot in embodiments of the present invention can be either a physical subframe or time slot or a logical subframe or time slot. Specifically, a logical subframe or time slot is a subframe or time slot corresponding to a resource pool of Sidelink communication. For example, in V2X system, the resource pool is defined by a repeated bit map, which is mapped to a specific time slot set, and the specific time slot set can include all time slots or all other time slots except some specific time slots (such as time slots for transmitting MIB/SIB). The time slot indicated as "1" in the bit map can be used for V2X transmission and belongs to the time slot corresponding to V2X resource pool; and the time slot indicated as "0" cannot be used for V2X transmission and does not belong to the time slot corresponding to V2X resource pool.

The difference between physical sub-frames or time slots and logical sub-frames or time slots could be explained by the following typical application scenario: when calculating the time-domain gap (Gap) between two specific channels/messages (for example, PSSCH carrying Sidelink data and PSFCH carrying corresponding feedback information), under the assumption that the Gap has N time slots, if calculating physical sub-frames or time slots, the N time slots correspond to the absolute time length of N*x milliseconds in the time domain, and x is the time length of the physical time slot (sub-frame) in the Numerology of the scenario, in milliseconds; and if calculating logical sub-frames or time slots, taking the Sidelink resource pool defined by the bitmap as an example, the interval of the N time slots corresponds to the N time slots indicated as "1" in the bitmap, and the absolute time length of the interval varies with the specific configuration of the Sidelink communication resource pool, without a fixed value.

In an embodiment of the present invention, the time slot may be a complete time slot or several OFDM symbols corresponding to Sidelink communication in a time slot. For example, when the Sidelink communication is configured to be performed on the X1st-X2nd OFDM symbols of each time slot, in this scenario, the time slot in the following embodiment refers to the X1st-X2nd OFDM symbols in one time slot; for another example, when the Sidelink communication is configured to be transmitted in a Mini-Slot, in this scenario, the time slot in the following embodiment refers to the mini-slot defined or configured in the Sidelink system, not the time slot in the NR system; for another example, when the Sidelink communication is configured as symbol-level transmission, in this scenario, the time slot in the embodiment may be replaced with OFDM symbols, or may be replaced with N OFDM symbols as the time domain granularity of the symbol-level transmission.

In the embodiment of the present invention, the information configured by the base station, the information indicated by signaling, the information configured by the higher layer, and the pre-configured information may be one set of configuration information or multiple sets of configuration information. When the information contains multiple sets of configuration information, the UE selects one set of configuration information from the multiple sets of configuration information for use according to predefined conditions. When the information is a set of configuration information, the set of configuration information may contain multiple subsets, and the UE selects one subset from the multiple subsets for use according to predefined conditions.

In the embodiment of the present invention, some technical solutions provided are specifically described based on V2X systems, but their application scenarios should not be limited to V2X systems in Sidelink communication, but can also be applied to other Sidelink transmission systems. For example, the design based on V2X subchannel in the following embodiments can also be used for D2D subchannels or other subchannels for Sidelink transmission. The V2X resource pool in the following embodiments can also be replaced by D2D resource pool in other Sidelink transmission systems such as D2D.

In the embodiment of the present invention, a value lower than the threshold can also be replaced by at least one of a value higher than the threshold, a value lower than or equal to the threshold, and a value higher than or equal to the threshold; similarly, a value higher than the threshold can be replaced by at least one of a value lower than the threshold, a value lower than or equal to the threshold, and a value higher than or equal to the threshold. Among other things, the related expressions can be replaced by other expressions with the same or similar meanings, for example, "higher than" can also be expressed as "exceeding".

In an embodiment of the present invention, a UE for transmitting the physical Sidelink data channel is called the transmission UE, and is marked as TX UE; and a UE for receiving the physical Sidelink data channel is called reception UE and is labeled as RX UE.

In an embodiment of the present invention, when the Sidelink communication system is a V2X system, the terminal or UE may be various types of terminals or UEs such as Vehicle, Infrastructure, Pedestrian, etc.

In the prior art, the Sidelink UE needs to keep monitoring on the whole configured resource pool, which will cause large power consumption. In addition, in the prior art, channel sensing is also based on the premise that UE monitors and caches the resource pool, so channel sensing requires certain monitoring behavior and caching ability of UE. UEs that are sensitive to power consumption and may have weak cache capacity will be introduced in the future version, which are not suitable to adopt the existing mechanism.

Compared with the mechanism that UE always keeps monitoring in the resource pool in Rel-16, in order to make the Sidelink system more widely applicable to various devices, especially devices that rely on batteries and are relatively sensitive to power consumption, such as handheld terminals, it is necessary to introduce a mechanism that is suitable for the Sidelink system and can make UE turn off the transmitting/receiving function regularly, thereby reducing power consumption.

Before proceeding to the following detailed description, it may be advantageous to set forth the definitions of certain words and phrases used throughout this patent document. The term "coupled" and its derivatives refer to any direct or indirect communication between two or more elements, whether or not those elements are in physical contact with each other. The terms "transmission", "reception" and "communication" and their derivatives cover both direct and indirect communication. The terms "including" and "containing" and their derivatives mean including but not limited to. The term "or" is inclusive and means and/or. The phrase "associated with" and its derivatives mean to include, be included in, interconnected, contained, contained in, in connection with, couple or connect with, communicating with, cooperating, interweaving, juxtaposing, approaching, binding or binding with, having, having an attribute, having a relationship, or being related to, etc. The term "controller" refers to any device, system or part thereof that controls at least one operation. Such a controller may be implemented in hardware or a combination of hardware and software and/or firmware. The functions associated with any particular controller may be centralized or distributed, whether local or remote. The phrase "at least one", when used with a list of items, means that different combinations of one or more of the listed items may be used, or only one item in the list may be used. For example, "at least one of A, B and C" includes any one of the following combinations: A, B, C, A and B, A and C, B and C, A and B and C. As used herein, each of phrases such as "A or B" and "A, B or C" may include all possible combinations of items enumerated in a corresponding one of these phrases.

Definitions of other specific words and phrases are provided throughout this patent document. It should be understood by those of ordinary skill in the art that in many cases, if not most cases, this definition is applicable to the previous and future uses of the words and phrases thus defined.

In order to make the object, technical scheme and advantages of the present invention clearer, the embodiments of the present invention will be further described in detail with reference to the accompanying drawings.

Figure 4:
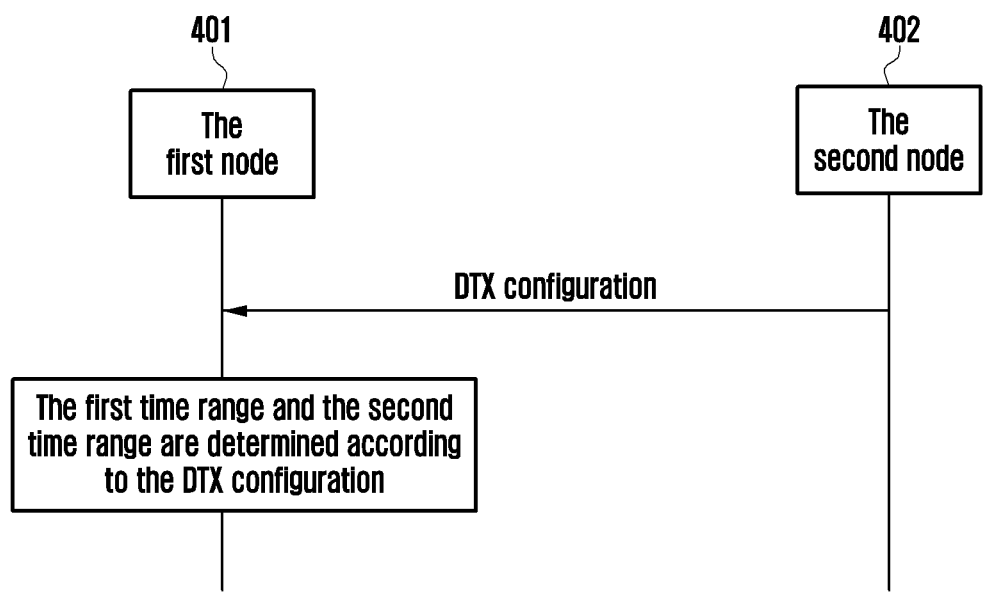
FIG. 4 shows a schematic diagram of a first node and a second node according to the present disclosure.

FIG. 4 shows a first node and a second node according to an embodiment of the present invention.

In this embodiment, the first node 401 obtains a DTX configuration (also called DRX configuration, sleep/awake configuration, etc., which does not affect the application of the method in the present invention) from the second node 402, determines to keep awake and normally perform Sidelink communication and/or uplink and downlink communication in the first time range according to the DTX configuration, and enters a sleep state and stops uplink transmission, downlink reception, Sidelink transmission and reception in the second time range. The first node may be a UE supporting Sidelink communication, and the second node may be a UE supporting Sidelink communication (including the first node itself and/or other UE) or a base station. The first time range may also be referred to as an on-duration, and the second time range may also be referred to as an off-duration.

The DTX configuration acquired by the first node from the second node includes periodic and/or aperiodic DTX configuration. Further, the periodic DTX configuration includes at least one of the following:

A first time range corresponding to all Sidelink transmissions and/or uplink and/or downlink transmissions in one cycle;

A first time range corresponding to the Sidelink transmission scheduled by a configured grant in one cycle, wherein the configured grant includes the type 1 configured grant and/or type 2 configured grant indicated by RRC and/or RRC and DCI;

A first time range corresponding to the Sidelink transmission scheduled by a dynamic grant in one cycle, wherein the dynamic grant includes the dynamic grant indicated by DCI (for example, DCI formats 3-0 and 3-1 for Sidelink scheduling);

A first time range corresponding to channel perception;

A first time range corresponding to a resource for transmitting PSSCH within one period, wherein the resource is determined by the first terminal based on channel perception;

A first time range corresponding to the Sidelink transmission of a specific one or more priorities in one cycle;

A first time range corresponding to the Sidelink transmission of a specific cast type in one cycle;

A first time range corresponding to the Sidelink transmission of a specific one or more destination IDs in one cycle;

A first time range corresponding to the Sidelink transmission of a specific one or more source IDs in one cycle;

A first time range corresponding to the Sidelink transmission of one or more specific HARQ feedback options and/or of HARQ process IDs in one cycle;

A first time range corresponding to one or N specific Sidelink transmissions in one cycle, wherein N is a positive integer;

A first time range corresponding to the initial transmission of one TB in one cycle;

A first time range corresponding to N HARQ retransmissions of one TB in one cycle, wherein N is a non-negative integer;

A first time range corresponding to the transmission of PSSCH and/or associated PSCCH;

A first time range corresponding to the transmission of PSFCH of PSSCH;

A first time range corresponding to resource reselection, wherein the resource reselection includes resource reselection triggered by other terminals occupying its own selected resources (e.g., re-evaluation and pre-emption in R16);

A first time range corresponding to NR Sidelink communication;

A first time range corresponding to LTE Sidelink communication;

A first time range corresponding to UE with specific UE capability;

A first time range corresponding to an uplink and/or downlink transmission corresponding to the one or more Sidelink transmissions (for example, HARQ-ACK feedback on PUCCH corresponding to Sidelink transmission); and A second time range, wherein the second time range includes an explicitly configured second time range indicated in the same manner as the first time range using the above listed items, or wherein the second time range is set such that all time domain resources that do not belong to the first time range within one cycle belong to the second time range.

The Sidelink transmission includes Sidelink transmitting and/or Sidelink reception, and uplink and/or downlink transmission includes uplink transmitting and/or downlink reception. Among other things, any of the above items can be configured by independent parameters in DTX configuration, and/or determined by derivation of specific parameters in DTX configuration, and/or determined by scheduling information/configuration information for Sidelink transmission.

The way of indicating the first time range and/or the second time range in the periodic DTX configuration includes at least one of the following: the length of the cycle; the starting position of the first time range and/or the second time; the ending position of the first time range and/or the second time; the duration of the first time range and/or the second time. The starting/ending position can be indicated by the offset from a reference point, and the reference point includes at least one of a specific frame index (e.g., SFN0), a slot/symbol index, and the absolute time.

Optionally, the first time range and/or the second time range are determined according to specific parameters in DTX configuration and/or according to scheduling information/configuration information for Sidelink transmission, including at least one of the following situations:

The first time range −2 is determined according to the explicitly indicated first time range −1 and the offset between the first time range −1 and the first time range −2 indicated in the DTX configuration. The offset includes an offset between the starting/ending position of any one of the first time range −1 and the first time range −2 and the starting/ending position of the other one of the first time range −1 and the first time range −2. In this method, the duration of the first time range −2 may be dynamic or fixed. It can be determined after deduction according to offset, and/or (pre) configured/(pre) defined, including configured in DTX configuration;

The first time range and/or the second time range are determined according to whether the first node needs retransmission, and/or whether the first node needs to transmit a new TB, and/or resources reserved by the first node in the SCI.

Optionally, when the first time range corresponds to the transmission of PSSCH and/or associated PSCCH, the first time range includes PSSCH resources for the current transmission (i.e., PSSCH associated with the SCI in the PSCCH) indicated in the SCI associated with PSSCH (i.e., the SCI in the associated PSCCH), and PSSCH resources reserved for future transmission in the SCI.

Optionally, the PSSCH resources reserved in SCI include PSSCH resources explicitly indicated in SCI (in Rel-16, SCI indicates at most three resources, one for current transmission and the other two for reservation at most), and also include PSSCH resources reserved in the next PSSCH cycle (note that this cycle and DTX cycle can be independent of each other). Accordingly, the first time range corresponding to the transmission of PSFCH corresponding to PSSCH includes PSFCH resources corresponding to the above-mentioned various PSSCH resources.

Optionally, for each PSSCH resource reserved by SCI in the current cycle, there are corresponding reserved resources in the next PSSCH cycle. Accordingly, the PSSCH resources (and/or PSCCH resources and/or PSFCH resources) reserved in each next cycle have a corresponding first time range.

The existence of the first time range and/or the second time range included in the above DTX configuration may be dynamic, it includes deducing and determining whether any of the above-mentioned first time ranges and/or any of the above-mentioned second time ranges exist in this cycle according to specific parameters.

For example, if a certain first time range corresponds to HARQ retransmission, the first time range does not exist when the transmission is successful, that is, HARQ retransmission is not required.

In an exemplary embodiment, the periodic DTX configuration explicitly indicates a first time range including the transmission scheduled by a configured grant within one corresponding cycle. Particularly, the first time range corresponds to maximum 3 PSSCH resources which are scheduled by configured grants and PSCCH resources associated with them, for example, the maximum 3 resources are included in the first time range. According to the prior art of Rel-16, the maximum 3 PSSCH resources can be used for the initial transmission+maximum 2 retransmissions of one TB or maximum 3 retransmissions of one TB. Accordingly, the first time range corresponds to the initial transmission and at most 2 retransmissions of one TB in one cycle, or at most 3 retransmissions of one TB in one cycle. In addition, if the resources scheduled by the configure grant are used for HARQ-based transmission, the first time range may also include PSFCH resources corresponding to the maximum 3 PSSCH, and accordingly, the first time range also corresponds to the transmission of PSFCH. In this exemplary embodiment, one first time range corresponds to more than one of the contents included in the above-mentioned periodic DTX configuration.

In another exemplary embodiment, the periodic DTX configuration includes four first time ranges, and the first time range −1 corresponds to first PSSCH resource scheduled by the configured (or dynamically) grant, which can be used for the initial transmission of one TB. The first time range −2 corresponds to the PSFCH resource corresponding to the first PSSCH resource. The first time range −3 corresponds to the other two PSSCH resources scheduled by the configured grant, which can be used for up to two retransmissions of the TB. The first time range −4 corresponds to the PSFCH resources corresponding to the other two PSSCH resources. The first time range −1 is explicitly indicated in the periodic DTX configuration, the first time range −2 is deduced and determined according to PSSCH-PSFCH resource mapping rules, the first time range −3 is determined according to PSSCH resources reserved in SCI when TB is transmitted for the first time, and the first time range −4 is deduced and determined according to PSSCH-PSFCH resource mapping rules. In this exemplary embodiment, the first time range −¾ may not exist, because if the initial transmission of one TB is successful, the remaining resources scheduled by the configured grant will not be used for the transmission of the new TB, so the UE can stop the transmission and enter a sleep state after the first time ranges −1 and −2 are over.

Figure 5:
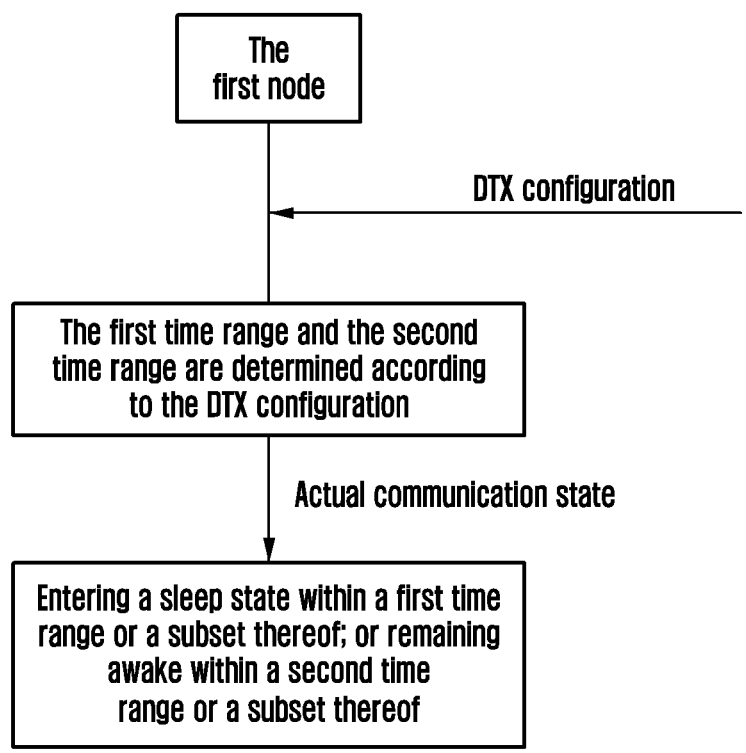
FIG. 5 shows a schematic diagram of the operation after determining the first and/or second time range according to the DTX configuration according to an embodiment of the present invention.

FIG. 5 shows a schematic diagram of the operation after determining the first and/or second time range according to the DTX configuration according to an embodiment of the present invention.

In this embodiment, after the first node obtains the DTX configuration and determines the first and/or second time range, it can also perform at least one of the following according to the actual transmission conditions:

Entering a sleep state in a first time range or a subset thereof and stopping uplink transmitting, downlink reception, Sidelink transmitting and reception;

And staying awake in the second time range or a subset thereof and normally carry out Sidelink communication and/or uplink and downlink communication.

Furthermore, the operation comprises at least one of the following methods:

Method 1: when the first node is the transmitter, if the first time range corresponds to the transmission of PSSCH and/or PSFCH, and the data corresponding to PSSCH and/or PSFCH has not been successfully transmitted, the first node will remain awake in the second time range and try to retransmit the data corresponding to PSSCH and/or PSFCH, until entering the sleep state after at least one of the following conditions is met: the data is successfully transmitted, the transmission on the resources reserved in the SCI associated with the PSSCH (which can be the SCI in the first time range) has been completed, the number of retransmissions of the data does not meet the specific threshold range (for example, it exceeds the predefined threshold value or the threshold value configured by the base station (based on priority)), the retransmission of the data is dropped, and the time for keeping awake in the second time range does not meet the specific threshold range. Optionally, the method is used only when the following conditions are met: retransmission resources are not within the first time range and/or within any first time range and/or second time range indicated by DTX configuration. The retransmission resources include resources reserved in the SCI associated with the PSSCH (which may be SCI in the first time range) or a subset thereof.

A concrete example is that the first time range corresponds to the transmission of TB1 on PSSCH1, and the PSFCH corresponding to the transmission is NACK, that is, the transmission fails. SCI1 in PSCCH associated with PSSCH1 indicates PSSCH1, PSSCH2 and PSSCH3 (i.e., PSSCH2 and PSSCH3 are reserved) and PSSCH2 and PSSCH3 are in the second time range. The UE will remain awake in the second time range until TB1 is retransmitted on PSSCH2 and the corresponding PSFCH is received as ACK, that is, the transmission is successful, and then enter into the sleep state.

In case that the first node is the receiver, if the first time range corresponds to the transmission of PSSCH and/or PSFCH, and the data corresponding to PSSCH and/or PSFCH is not successfully received, the first node will remain awake in the second time range and try to receive the retransmission of the data corresponding to PSSCH and/or PSFCH, until entering the sleep state after at least one of the following conditions is met: the data is successfully received, the reception on the resources reserved in the SCI associated with the PSSCH (which can be the SCI in the first time range) has been completed, the retransmission times of the data does not meet the specific threshold range (for example, it exceeds the predefined threshold value or the threshold value configured by the base station (based on priority)), the data reception is dropped, and the time for keeping awake in the second time range does not meet the specific threshold range. Optionally, the method is used only when the following conditions are met: retransmission resources are not within the first time range and/or within any first time range and/or second time range indicated by DTX configuration. The retransmission resources include resources reserved in the SCI associated with the PSSCH (which may be SCI in the first time range) or a subset thereof.

Method 2: when the first node is the transmitter, if the first time range corresponds to the transmission of PSSCH and/or PSFCH, and the first node has other data to transmit, the first node will remain awake in the second time range and try to retransmit the data corresponding to the PSSCH and/or PSFCH, until entering the sleep state after at least one of the following conditions is met: the other data is successfully transmitted, the transmission on the resources reserved in the SCI associated with the PSSCH has been completed, the transmission of the other data is dropped, and the time for keeping awake in the second time range does not meet a specific threshold range. Optionally, the method is used only when the following conditions are met: the resources for transmitting the other data are not within the first time range and/or within any first time range and/or second time range indicated by DTX configuration. The resources for transmitting the other data include the resources reserved in the SCI associated with the PSSCH or a subset thereof.

A concrete example is that the first time range corresponds to the transmission of TB1 on PSSCH1, and the PSFCH corresponding to the transmission is ACK, that is, the transmission is successful. SCI1 in PSCCH associated with PSSCH1 indicates PSSCH1, PSSCH2 and PSSCH3 (i.e., PSSCH2 and PSSCH3 are reserved), and PSSCH2 and PSSCH3 are in the second time range. The UE still needs to transmit TB2, so it will stay awake in the second time range until it transmits TB2 on PSSCH2 and receives the corresponding PSFCH as NACK, that is, the transmission fails; continue to keep awake until TB2 is retransmitted on PSSCH3 and the corresponding PSFCH is received as ACK, that is, the transmission is successful; and then enter into the sleep state.

In case that the first node is the receiver, if the first time range corresponds to the transmission of PSSCH and/or PSFCH, and the first node has other data to receive, the first node will remain awake in the second time range and try to receive the retransmission of the data corresponding to the PSSCH and/or PSFCH, until entering the sleep state after at least one of the following conditions is met: the other data is successfully received, the reception on the resources reserved in the SCI associated with the PSSCH (which can be the SCI in the first time range) has been completed, the reception of the other data is dropped, and the time for keeping awake in the second time range does not meet a specific threshold range. Optionally, the method is used only when the following conditions are met: the resources for transmitting the other data are not within the first time range and/or within any first time range and/or second time range indicated by DTX configuration. The resources for transmitting the other data include the resources reserved in the SCI associated with the PSSCH (which may be the SCI in the first time range) or a subset thereof.

Method 3: when the first node is the transmitter, if the first time range corresponds to the transmission of PSSCH and/or PSFCH, and the transmission corresponding to PSSCH and/or PSFCH includes the initial transmission and retransmission, then the first node enters the sleep state after completing the data transmission in the first time range. The completion of data transmission includes that one TB is successfully transmitted and/or no new TB needs to be transmitted.

In case that the first node is the receiver, if the first time range corresponds to the transmission of PSSCH and/or PSFCH, and the transmission corresponding to PSSCH and/or PSFCH includes the initial transmission and retransmission, the first node enters the sleep state after completing the data reception in the first time range. The completion of receiving the data includes that one TB is successfully received and/or no new TB needs to be received.

Method 4: for the case that the first node is the transmitter, if the first time range corresponds to the transmission of PSSCH and/or PSFCH, the first node only keeps awake on the time domain resources that need to transmit PSSCH and/or receive the transmission of PSFCH in the first time range. Optionally, if the transmission of the PSSCH is determined based on the channel perception, the first node will also keep awake on the time domain resources corresponding to the channel sensing in the first time range. The first node enters the sleep state on other resources within a first time range. Optionally, the method is used only when the following conditions are met: the first node is (pre) configured to not perform Sidelink reception, and only needs to perform Sidelink transmission.

In case that the first node is the receiver, if the first time range corresponds to the transmission of PSSCH and/or PSFCH, the first node will remain awake for the following time within the first time range:
Before receiving the first specific PSSCH;
Time domain resources for receiving the data carried in the first specific PSSCH, including receiving the initial transmission and/or retransmission of the data carried in the PSSCH until the reception is successful;
Optionally, the resources reserved in the SCI associated with the first specific PSSCH.

The specific PSSCH includes a PSSCH corresponding to a specific UE source ID.

The method and conditions for the first node to stay awake in the second time range in Method 1 or Method 2 can be similar to those in Method 4, that is, it only stays awake on the time domain resources that need to be transmitted/received in the second time range, and enters the sleep state on other resources in the second time range. The conditions in Method 4 may or may not be used in Method ½, because in Method ½, it can be assumed that the UE has completed the necessary reception in the first time range, and does not need to continue to stay awake for the purpose of Sidelinking reception in the second time range.

For aperiodic DTX configuration, all the above methods applicable to periodic DTX configuration can be similarly used in aperiodic DTX coordination, with the following differences:

In the method of indicating the first/second time range within one cycle in periodic DTX configuration, the cycle (e.g., the starting position of the cycle) may be taken as a reference point, and correspondingly, in aperiodic DTX configuration, a (pre-) defined/(pre-) configured reference point, e.g., SFN0, is adopted. As a specific example, the same method can be used in periodic DTX configuration to indicate that the first time range in one cycle includes N1~N2 time slots, and in aperiodic DTX configuration to indicate that the first time range includes time slots with index N1~N2 (assuming that the predefined reference point is SFN0).

In the periodic DTX configuration, the default first time range and second time range are both periodically repeated.

In aperiodic DTX configuration, the first time range and/or the second time range indicated in one signaling will take effect once unless the number of repetitions of DTX configuration is additionally indicated.

For Sidelink transmission, if at least one of the transmission UE and the receiver UE is configured with DTX, other UE may need to obtain the corresponding DTX configuration to ensure that the UE configured with DTX can make Sidelink transmitting or receiving during its ON cycle, so that the message can be delivered correctly. Therefore, it is necessary to introduce a mechanism to share DTX configuration among different Sidelink UE.

Figure 6A:
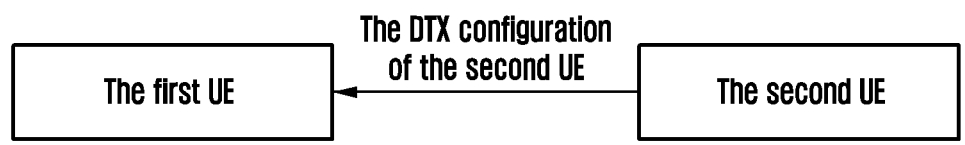
FIG. 6a shows schematic diagrams of acquiring DTX configuration of a second UE by a first UE.
Figure 6B:
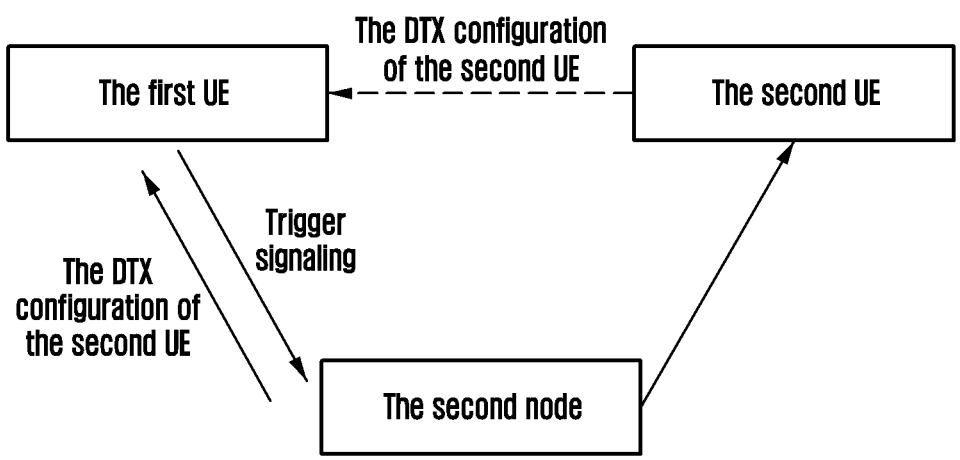
FIG. 6b shows schematic diagrams of acquiring DTX configuration of a second UE by a first UE.

FIGS. 6a and 6b show schematic diagrams of acquiring DTX configuration of a second UE by a first UE.

The first UE acquires the DTX configuration of the second UE, performs Sidelink transmission according to the DTX configuration of the second UE, and transmits signals/channels to the second UE when the second UE does not enter the sleep state, and does not transmit signals/channels to the second UE when the second UE enters the sleep state. For example, for the transmission between the first UE and the second UE, if the time of the transmission corresponds to the sleep state of the second UE, the first UE delays or drop the transmission.

The first UE obtains the DTX configuration of the second UE, including obtaining when at least one of the following conditions is met:

The first UE is configured with DTX feature;
The first UE obtains the common DTX configuration and/or determines that the DTX feature is enabled in the Sidelink system; for example, the first UE obtains the DTX configuration indicated in the resource pool configuration, and/or the first UE determines that the DTX feature is enabled in the Sidelink system according to the information indicated in the broadcast/multicast/unicast signaling;
According to the information broadcast or sent by the second UE to the first UE, judging that the second UE is configured with DTX feature;
A trigger signaling from the second UE or other UE is received, which is used to trigger the first UE to acquire the DTX configuration of the second UE;
Transmitting trigger signaling to the second UE, which is used to trigger the second UE to transmit its DTX configuration to the first UE and/or other UEs;
The identity of the first UE and/or the second UE belongs to a (pre) defined/(pre) configured set;
The link quality between the first UE and the second UE does not meet a specific threshold range.

The link quality includes the link strength and/or transmission state with the second UE. The link strength includes measurement results (such as RSRP and CQI) of reference signals (such as DMRS, CSI-RS, PT-RS and S-SSB). The transmission state includes the number of transmission failures with the second UE, and further includes at least one of the following: the number of continuous transmission/reception failures, the number of transmission/reception failures within a certain time, and the number of unsuccessful transmission/reception on reserved resources. The transmission state may also include at least one of the following: the number of HARQ retransmissions required for a successful TB transmission/reception; the times of resource reselection (which can be continuous and/or within a certain time), including resource reselection triggered by re-evaluation and/or pre-emption. Whether the transmission/reception fails can be determined by multiplexing the processing method of HARQ-ACK feedback information in the existing mechanism.

The information broadcast by the second UE or sent to the first UE (through unicast and/or multicast) includes at least one of the following:

Information indicated in RRC signaling; the indication may be specific to specific parameters, for example, it is indicated separately for each priority/transmission type; a concrete example is that the second UE indicates to the first UE that the second UE is configured with DTX feature through PC5-RRC, including indicating UE capability of the second UE through RRC, which includes whether DTX is supported/enabled;
Information indicated in MAC signaling;
The information indicated in the physical layer signaling, for example, the second UE indicates whether DTX is supported/enabled through a specific field (e.g., a 1-1 bit DTX indication field) in the PSCCH or SCI format, wherein the SCI format may be a newly introduced SCI format (e.g., SCI format 0-3 or 0-2A).

In an exemplary embodiment, if the RRC link can be established between the first node and the second node, the information is preferentially obtained/indicated in RRC; otherwise, the information is obtained/indicated in MAC and/or physical layer signaling.

The first UE obtains the DTX configuration of the second UE according to the information broadcast or sent to the first UE by the second UE, including: determining the resources used for receiving the information broadcast or sent to the first UE by the second UE according to the (pre-)defined/(pre-)configured information, and receiving the information from the second UE on the resources.

The first UE obtains the DTX configuration of the second UE, including: receiving its own DTX configuration indicated by the second UE in the Sidelink signaling and/or receiving the DTX configuration of the second UE indicated by the base station. Furthermore, it also includes: transmitting a trigger signaling to the second node, which is used to trigger the second UE to transmit its DTX configuration to the first UE, and/or to trigger the second node to transmit the DTX configuration of the second UE to the first UE. Furthermore, the first UE indicates the identity of the second UE in the trigger signaling sent to the second node. The second node includes at least one of the second UE, a base station, and other Sidelink UE.

In an exemplary embodiment, the first UE transmits a trigger signaling to the second UE in a unicast manner, for triggering the second UE to transmit its own DTX configuration to the first UE. In another exemplary embodiment, the first UE transmits trigger signaling to a plurality of second UEs in the group in a multicast manner, for triggering a plurality of second UEs to transmit their own DTX configuration to the first UE. In another exemplary embodiment, the first UE transmits a trigger signaling in a broadcast manner, in which the identities of one or more second UEs are indicated, for triggering the corresponding one or more second UEs to transmit their own DTX configuration to the first UE. In another exemplary embodiment, the first UE transmits a trigger signaling to the second UE, which indicates the identities of one or more second UEs, for triggering the base station to transmit the DTX configuration of the corresponding one or more second UEs to the first UE.

Accordingly, the second UE transmits its own DTX configuration to the first UE, including when at least one of the following conditions is met:

The second UE is configured with DTX feature;

The second UE obtains the common DTX configuration and/or determines that the DTX feature is enabled in the Sidelink system according to the broadcast signaling; for example, the second UE obtains the DTX configuration indicated in the resource pool configuration;

According to the information broadcast or sent to the second UE by the first UE, judging that the first UE is configured with DTX feature;

A trigger signaling is received from the first UE or other UEs, for triggering the second UE to transmit its own DTX configuration to the first UE or other UEs (for example, triggering the second UE to broadcast its own DTX configuration);

Transmitting trigger signaling to the first UE, for triggering the first UE to receive DTX configuration from the second UE;

The identity of the first UE and/or the second UE belongs to a (pre) defined/(pre) configured set;

The link quality between the first UE and the second UE does not meet a specific threshold range.

The second UE transmits its own DTX configuration to the first UE, including: determining the resources used for transmitting its own DTX configuration to the first UE according to the (pre) definition/(pre) configuration information, and transmitting the DTX configuration on the resources.

The second UE may multiplex the above conditions and/or methods for transmitting its DTX configuration to the first UE and transmit the DTX configuration to the second node, which includes the base station and/or any UE.

Figure 7:
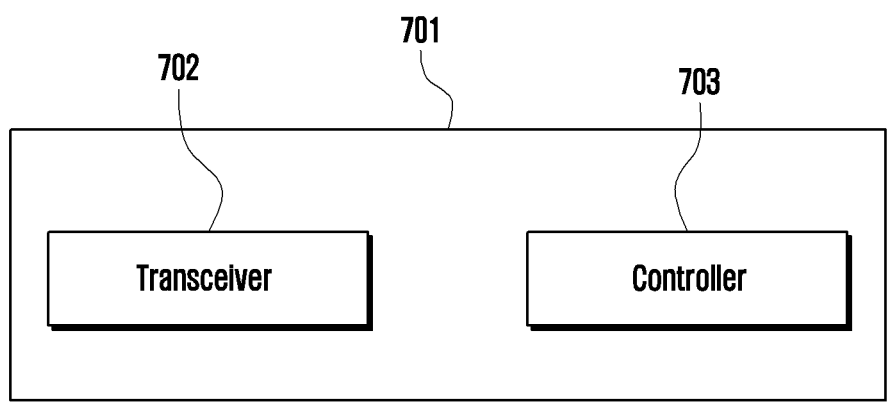
FIG. 7 shows a schematic diagram of an device for executing a method in a Sidelink system according to an embodiment of the present invention.

FIG. 7 shows a device for performing a method in a Sidelink system according to an embodiment of the present invention. Referring to FIG. 7, the device 701 includes a transceiver 702 and a controller 703, which is configured to acquire the DTX configuration of discontinuous transmission from a network node; determining a first time range and/or a second time range according to the acquired DTX configuration; staying awake in the first time range, or entering into a sleep state in the second time range.

Figure 8:
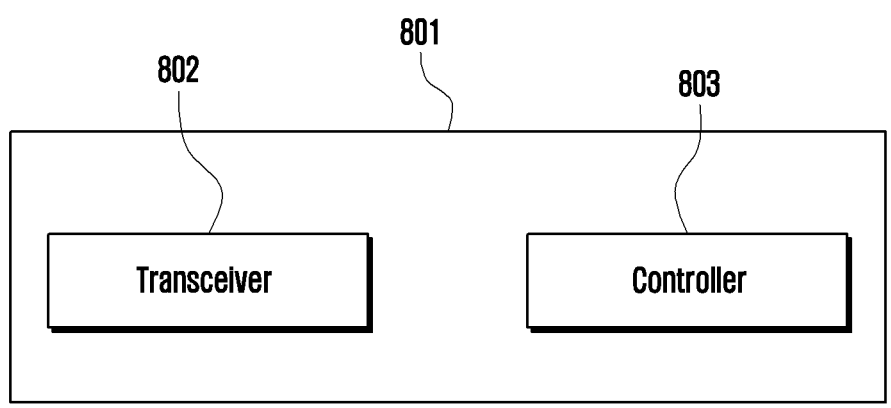
FIG. 8 shows a schematic diagram of a first device for executing a method for acquiring a DTX configuration between different Sidelink terminals according to an embodiment of the present invention.

FIG. 8 shows a first device for executing a method for acquiring the DTX configuration between different Sidelink terminals according to an embodiment of the present invention. Referring to FIG. 8, the first device 801 includes: a transceiver 802 configured to acquire the DTX configuration of the second device, and a controller 803 configured to perform Sidelink transmission according to the DTX configuration of the second terminal.

The embodiment of the invention provides a method for UE to introduce DTX mechanism into a Sidelink system so as to reduce power consumption. According to the method, the UE can enter the sleep state within an appropriate time range based on the actual situation of DTX configuration and transmission, thereby greatly reducing the power consumption of Sidelink communication. At the same time, different Sidelink UEs can communicate normally in a waking state through proper configuration of the system and cooperation between UEs, thus ensuring that DTX mechanism will not cause serious negative impact on the performance of Sidelink communication.

The embodiment of the invention also provides a method for adjusting the channel sensing flow based on the DTX mechanism. The method can enable UE to adjust the time range of channel sensing based on the actual situation of DTX configuration and transmission/reception, thereby reducing the power consumption of channel sensing as much as possible. The mechanism can dynamically determine the adjustment method based on the service characteristics, so that the channel sensing process applying the mechanism still has good usability for the Sidelink service.

Those of ordinary skill in the technical field can understand that all or part of the steps carried by the method for implementing the above embodiments can be completed by instructing related hardware through a program, which can be stored in a computer readable storage medium, and the program includes one or a combination of the steps of the method embodiments when executed.

As those skilled in the art know, according to the structure, the above example structure can be implemented in various ways, such as program instructions executed by a processor, software modules, microcode, computer program products on a computer readable medium, analog/logic circuits, application specific integrated circuits, firmware, consumer electronic devices, AV devices, wireless/wired transmitters, wireless/wired receivers, networks, multimedia devices, and the like. Furthermore, embodiments of the structure may take the form of an entirely hardware embodiment, an entirely software embodiment, or an embodiment containing elements of both hardware and software.

One or more embodiments have been described with reference to flowcharts and/or block diagrams of methods, devices (systems) and computer program products according to one or more embodiments. Each block or combination of such diagrams/charts may be implemented by computer program instructions. When provided to a processor, the computer program instructions generate a machine such that the instructions, which are executed via the processor, create means for implementing the functions/operations specified in the flowchart and/or block diagrams. Each block in the flowchart/block diagram may represent hardware and/or software modules or logic implementing one or more embodiments. In alternative embodiments, the functions marked in the boxes may occur simultaneously, out of the order marked in the figure, and so on.

The terms "computer program medium", "computer usable medium", "computer readable medium" and "computer program product" are generally used to refer to media such as main memory, auxiliary memory, removable storage drive, hard disk installed in hard disk drive, etc. These computer program products are means of providing software to computer systems. A computer-readable medium allows a computer system to read data, instructions, messages or message packets and other computer-readable information from the computer-readable medium. For example, the computer-readable medium may include nonvolatile memory such as floppy disks, ROM, flash memory, disk drive memory, CD-ROM and other permanent storage. For example, it can be used to transfer information, such as data and computer instructions, between computer systems. Computer program instructions may be stored in a computer-readable medium that may direct a computer, other programmable data processing device, or other device to operate in a particular manner, such that the instructions stored in the computer-readable medium produce an article of manufacture including instructions that implement the functions/acts specified in the flowchart and/or block diagram.

Computer program instructions representing the block diagrams and/or flowcharts herein may be loaded onto a computer, a programmable data processing device, or a processing device, so that a series of operations performed thereon produce computer-implemented processes. A computer program (i.e., computer control logic) is stored in the main memory and/or the auxiliary memory. A computer program may also be received via a communication interface. Such computer programs, when executed, enable a computer system to perform the features of the embodiments discussed herein. In particular, the computer program, when executed, enables the processor and/or the multi-core processor to perform features of the computer system. This computer program represents the controller of a computer system. A computer program product includes a tangible storage medium readable by a computer system and stores instructions executed by the computer system for performing the method of one or more embodiments.

Although the present disclosure has been described with exemplary embodiments, various changes and modifications can be suggested to those skilled in the art. This disclosure is intended to cover such changes and modifications as fall within the scope of the appended claims.

Any description in the present invention should not be understood as implying that any particular element, step or function is an essential element that must be included within the scope of the claims. The scope of patent subject matter is limited only by the claims.

The invention claimed is:

1. A method performed by a user equipment (UE) in a communication system, the method comprising:
   obtaining first discontinuous reception (DRX) configuration information associated with sidelink;
   obtaining second DRX configuration information associated with communication with a base station;
   identifying, based on the first DRX configuration information, at least one first time range for first DRX associated with the sidelink;
   identifying, based on the second DRX configuration information, at least one second time range for second DRX associated with the communication with the base station;
   identifying, based on the at least one first time range, whether to perform sidelink communication; and
   identifying, based on the at least one second time range, whether to perform the communication with the base station,
   wherein the at least one second time range includes a time range associated with a physical uplink control channel (PUCCH) for hybrid automatic repeat request (HARQ) feedback for the sidelink.

2. The method of claim 1, wherein the at least one first time range includes a time range associated with a retransmission of sidelink communication data.

3. The method of claim 1,
   wherein the at least one first time range includes a time range where a starting position of the time range is identified based on an offset,
   wherein the offset is between the starting position of the time range and a starting position of a cycle associated with the first DRX, and
   wherein the first DRX configuration information includes information on the offset.

4. The method of claim 1,
   wherein an initial transmission of sidelink communication data is received based on the at least one first time range, and
   wherein a retransmission of sidelink communication data is received based on the at least one first time range.

5. The method of claim 1, wherein the first DRX configuration information is associated with a source identifier for the sidelink.

6. The method of claim 1,
   wherein the at least one second time range includes a time range associated with sidelink transmission.

7. The method of claim 1, wherein the first DRX configuration information is associated with a destination identifier for the sidelink and a cast type for the sidelink.

8. The method of claim 1, wherein the sidelink communication includes transmission or reception of sidelink control information.

9. The method of claim 1, wherein the UE is in a sleep state for the second DRX in the time range associated with the PUCCH for the HARQ feedback for the sidelink.

10. A user equipment (UE) in a communication system, the UE comprising:
    a transceiver; and
    a processor coupled with the transceiver and configured to:
       obtain first discontinuous reception (DRX) configuration information associated with sidelink,
       obtain second DRX configuration information associated with communication with a base station,
       identify, based on the first DRX configuration information, at least one first time range for first DRX associated with the sidelink,
       identify, based on the second DRX configuration information, at least one second time range for second DRX associated with the communication with the base station,
       identify, based on the at least one first time range, whether to perform sidelink communication, and
       identify, based on the at least one second time range, whether to perform the communication with the base station,
    wherein the at least one second time range includes a time range associated with a physical uplink control channel (PUCCH) for hybrid automatic repeat request (HARQ) feedback for the sidelink.

11. The UE of claim 10, wherein the at least one first time range
    includes a time range associated with a retransmission of sidelink communication data.

12. The UE of claim 10,
    wherein the at least one first time range includes a time range where a starting position of the time range is identified based on an offset,
    wherein the offset is between the starting position of the time range and a starting position of a cycle associated with the first DRX, and
    wherein the first DRX configuration information includes information on the offset.

13. The UE of claim 10,
    wherein an initial transmission of sidelink communication data is received based on the at least one first time range, and
    wherein a retransmission of sidelink communication data is received based on the at least one first time range.

14. The UE of claim 10, wherein the first DRX configuration information is associated with a source identifier for the sidelink.

15. The UE of claim 10,
    wherein the at least one second time range includes a time range associated with sidelink transmission.

16. The UE of claim 10, wherein the first DRX configuration information is associated with a destination identifier for the sidelink and a cast type for the sidelink.

17. The UE of claim 10, wherein the sidelink communication includes transmission or reception of sidelink control information.

18. The UE of claim 10, wherein the UE is in a sleep state for the second DRX in the time range associated with the PUCCH for the HARQ feedback for the sidelink.

\* \* \* \* \*